(12) United States Patent
Liang et al.

(10) Patent No.: US 8,064,288 B2
(45) Date of Patent: Nov. 22, 2011

(54) METHOD FOR PASSIVE SEISMIC EMISSION TOMOGRAPHY USING ADAPTIVE VELOCITY FILTER

(75) Inventors: Chuntao Liang, Houston, TX (US); Michael P. Thornton, Houston, TX (US); Peter Morton, Katy, TX (US)

(73) Assignee: Microseismic, Inc., Houston, TX (US)

( * ) Notice: Subject to any disclaimer, the term of this patent is extended or adjusted under 35 U.S.C. 154(b) by 168 days.

(21) Appl. No.: 12/485,084

(22) Filed: Jun. 16, 2009

(65) Prior Publication Data

US 2010/0315903 A1    Dec. 16, 2010

(51) Int. Cl.
*G01V 1/36* (2006.01)
(52) U.S. Cl. .............................. 367/45; 367/73; 702/17
(58) Field of Classification Search .............. 367/25, 367/38, 43, 50, 59, 73; 702/6, 17
See application file for complete search history.

(56) References Cited

U.S. PATENT DOCUMENTS

| | | | | |
|---|---|---|---|---|
| 3,387,258 A | * | 6/1968 | Goupillaud et al. | 367/59 |
| 3,395,386 A | * | 7/1968 | Brown et al. | 367/43 |
| 6,956,790 B2 | * | 10/2005 | Haldorsen | 367/25 |
| 2008/0068928 A1 | * | 3/2008 | Duncan et al. | 367/73 |
| 2011/0004409 A1 | * | 1/2011 | Diallo et al. | 702/17 |

OTHER PUBLICATIONS

Alan R. Mitchell and Panos G. Kelamis, "Efficient tau-p hyperbolic velocity filtering," Geophysics, vol. 55, No. 5, May 1990, pp. 619-625.*

* cited by examiner

*Primary Examiner* — Jack Keith
*Assistant Examiner* — Daniel L Murphy
(74) *Attorney, Agent, or Firm* — Richard A. Fagin (57) ABSTRACT

A method for seismic event mapping includes adaptively velocity filtering seismic signals recorded at selected positions. The velocity filtered signals are transformed into a domain of possible spatial positions of a source of seismic events. An origin in spatial position and time of at least one seismic event is determined from space and time distribution of at least one attribute of the transformed seismic data.

21 Claims, 6 Drawing Sheets

METHOD FOR PASSIVE SEISMIC EMISSION TOMOGRAPHY USING ADAPTIVE VELOCITY FILTER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of seismic imaging of subsurface rock formations. More specifically, the invention relates to methods for determining hypocenters and focal mechanism of seismic events occurring in the Earth's subsurface.

2. Background Art

U.S. Patent Application Publication No. 2008/0068928 filed by Duncan et al. describes methods for determining the hypocenter (location of occurrence) of seismic events in the Earth's subsurface, and application of such methods to monitoring the progress of hydraulic fracturing operations. Such methods are generally known as "passive" seismic surveying because they do not use a separate, controllable seismic energy source to impart seismic energy into the subsurface, but use naturally occurring seismic events, or induced events such as breaking of rock formations by hydraulic fracturing. The described techniques in the Duncan et al. publication generally include deploying an array of seismic sensors on or near the surface, and recording signals produced by the sensors. The seismic signals are transformed into a domain of possible spatial positions of a source of seismic events. An origin in spatial position and time of at least one seismic event is determined from the space and time distribution of at least one attribute of the transformed seismic data.

An unavoidable aspect of passive seismic surveying is extended recording time in order to obtain sufficient signal to noise ratio. Such recording time may be several weeks to several months in length. In the case of hydraulic fracturing, the seismic events are limited in number and may not provide sufficient signal to noise ratio to be able to reliably identify hypocenters of the seismic events. It is desirable to have techniques for interpreting passive seismic signals that can improve signal to noise ratio.

SUMMARY OF THE INVENTION

A method for seismic event mapping according to one aspect of the invention includes adaptively velocity filtering seismic signals recorded at selected positions. The velocity filtered signals are transformed into a domain of possible spatial positions of a source of seismic events. An origin in spatial position and time of at least one seismic event is determined from space and time distribution of at least one attribute of the transformed seismic data.

A computer program according to another aspect of the invention may be stored in a computer readable medium. The program includes logic operable to cause a programmable computer to perform steps comprising adaptively velocity filtering seismic signals recorded at selected positions. The velocity filtered signals are transformed into a domain of possible spatial positions of a source of seismic events. An origin in spatial position and time of at least one seismic event is determined from space and time distribution of at least one attribute of the transformed seismic data.

Other aspects and advantages of the invention will be apparent from the following description and the appended claims.

DETAILED DESCRIPTION

Figure 1:
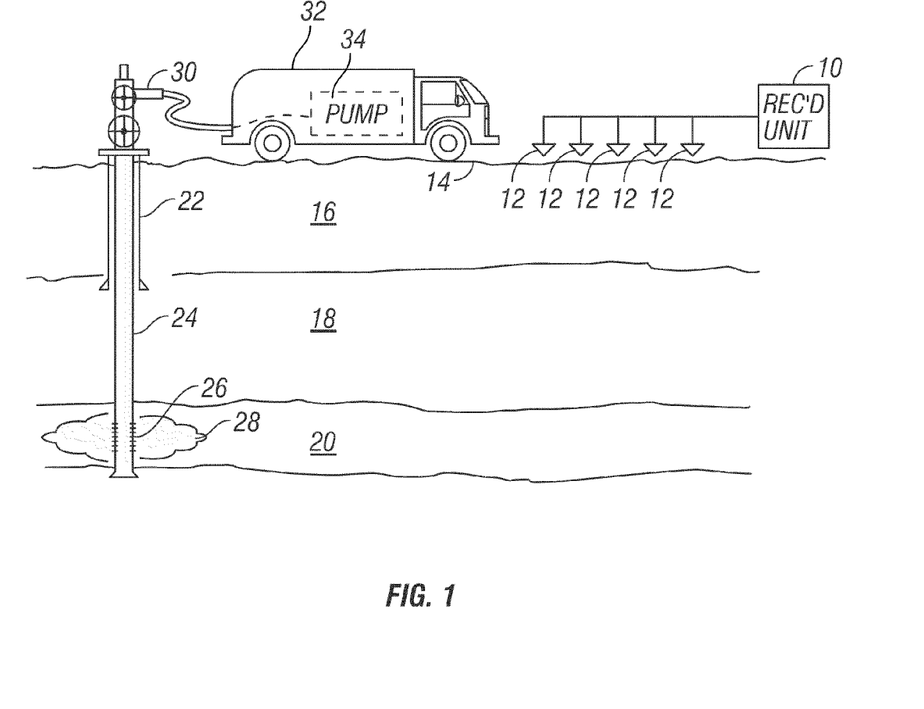
FIG. 1 shows an arrangement of seismic sensors used in a passive seismic method according to one embodiment of the invention associated with frac monitoring.

FIG. 1 shows a typical arrangement of seismic sensors as they would be used in one application of a method according to the invention. The example illustrated in FIG. 1 is associated with an application for passive seismic emission tomography known as "fracture monitoring." It should be clearly understood that the application illustrated in FIG. 1 is only one possible application of a method according to the invention.

In FIG. 1, each of a plurality of seismic sensors, shown generally at 12, is deployed at a selected position proximate the Earth's surface 14. In marine applications, the seismic sensors would typically be deployed on the water bottom in a device known as an "ocean bottom cable." The seismic sensors 12 in the present example may be geophones, but may also be accelerometers or any other sensing device known in the art that is responsive to velocity, acceleration or motion of the particles of the Earth proximate the sensor. The seismic sensors 12 generate electrical or optical signals in response to the particle motion or acceleration, and such signals are ultimately coupled to a recording unit 10 for making a time-indexed recording of the signals from each sensor 12 for later interpretation by a method according to the invention. In other implementations, the seismic sensors 12 may be disposed at various positions within a wellbore drilled through the subsurface formations. A particular advantage of the method of the invention is that it provides generally useful results when the seismic sensors are disposed at or near the Earth's surface. Surface deployment of seismic sensors is relatively cost and time effective as contrasted with subsurface sensor emplacements typically needed in methods known in the art.

In some examples, the seismic sensors 12 may be arranged in sub-groups having spacing therebetween less than about one-half the expected wavelength of seismic energy from the Earth's subsurface that is intended to be detected. Signals from all the sensors in one or more of the sub-groups may be added or summed to reduce the effects of noise in the detected signals.

In other examples, the seismic sensors 12 may be placed in a wellbore, either permanently for certain long-term monitoring applications, or temporarily, such as by wireline conveyance, tubing conveyance or any other sensor conveyance technique known in the art.

A wellbore 22 is shown drilled through various subsurface Earth formations 16, 18, through a hydrocarbon producing formation 20. A wellbore tubing 24 having perforations 26 formed therein corresponding to the depth of the hydrocarbon producing formation 20 is connected to a valve set known as a wellhead 30 disposed at the Earth's surface. The wellhead may be hydraulically connected to a pump 34 in a fracture pumping unit 32. The fracture pumping unit 32 is used in the process of pumping a fluid, which in some instances includes selected size solid particles, collectively called "proppant", are disposed. Pumping such fluid, whether propped or otherwise, is known as hydraulic fracturing. The movement of the fluid is shown schematically at the fluid front 28 in FIG. 1. In hydraulic fracturing techniques known in the art, the fluid is pumped at a pressure which exceeds the fracture pressure of the particular producing formation 20, causing it to rupture, and form fissures therein. The fracture pressure is generally related to the pressure exerted by the weight of all the formations 16, 18 disposed above the hydrocarbon producing formation 20, and such pressure is generally referred to as the "overburden pressure." In propped fracturing operations, the particles of the proppant move into such fissures and remain therein after the fluid pressure is reduced below the fracture pressure of the formation 20. The proppant, by appropriate selection of particle size distribution and shape, forms a high permeability channel in the formation 20 that may extend a great lateral distance away from the tubing 24, and such channel remains permeable after the fluid pressure is relieved. The effect of the proppant filled channel is to increase the effective radius of the wellbore 24 that is in hydraulic communication with the producing formation 20, thus substantially increasing productive capacity of the wellbore 24 to hydrocarbons.

The fracturing of the formation 20 by the fluid pressure creates seismic energy that is detected by the seismic sensors 12. The time at which the seismic energy is detected by each of the sensors 12 with respect to the time-dependent position in the subsurface of the formation fracture caused at the fluid front 28 is related to the acoustic velocity of each of the formations 16, 18, 20, and the position of each of the seismic sensors 12.

Having explained one type of passive seismic data that may be used with methods according to the invention, a method for processing such seismic data will now be explained. The seismic signals recorded from each of the sensors 12 may be processed first by certain procedures well known in the art of seismic data processing, including the summing described above, and various forms of filtering. The processing may be performed on a computer, for example, a computer disposed in the recording unit 10 or another computer.

In some examples, the sensors 12 may be arranged in directions substantially along a direction of propagation of acoustic energy that may be generated by the pumping unit 32, in the example of FIG. 1 radially outward away from the wellhead 30. By such arrangement of the seismic sensors 12, noise from the pumping unit 32 and similar sources near the wellhead 30 may be attenuated in the seismic signals by processing techniques for noise reduction and/or signal enhancement that will occur to those of ordinary skill in the art.

In the present invention, prior to determining hypocenters of the seismic events, and their subsequent use for determining progress of the fluid pumping in the formations, the signals are adaptively velocity filtered. In one example, the velocity filtering may be performed using a technique called adaptive f, k filtering. An example technique for adaptive f, k filtering will be explained below with reference to FIGS. 4 and 5.

Figure 2:
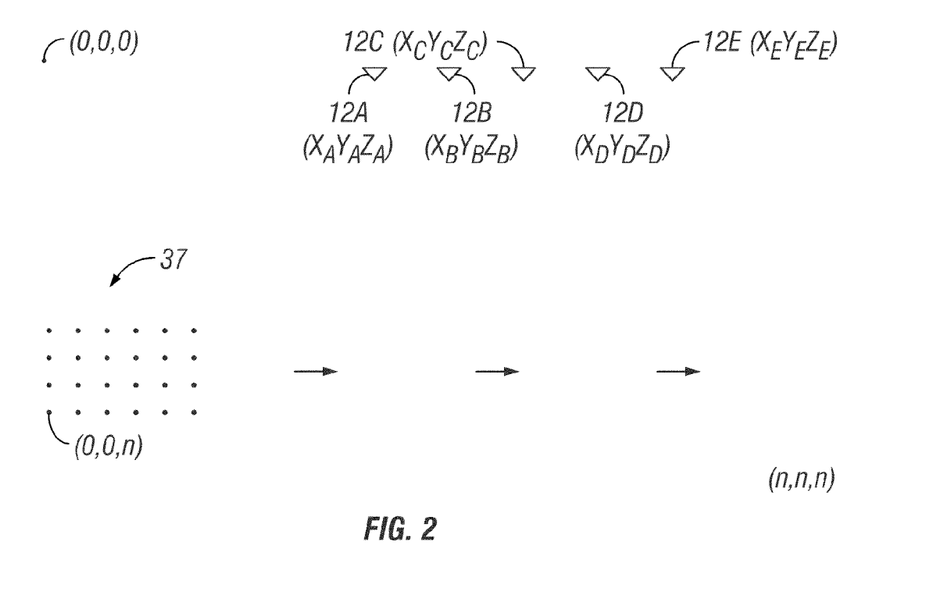
FIG. 2 illustrates a sensor space domain to source space domain data transformation used in association with a method according to the invention.

FIG. 2 illustrates a first element of a process according to the invention. A coordinate system may be arranged to define a plurality of points, or preferably, centers of geometric cells of selected dimensions in the Earth. The cells may have selected dimensions such as 10 meters or other suitable size, depending on, among other factors, the bandwidth of the signals detected by the sensors 12A through 12E. An arbitrary origin (0,0,0) may be defined, and in the present example, may be located at the position of the wellhead (30 in FIG. 1) and on the Earth's surface. Spatial coordinates of each sensor 12A-12E may thus be defined as shown in FIG. 2 as $(X_A, Y_A, Z_A)$ through $(X_E, Y_E, Z_E)$. The coordinate system may be defined to a selected number n of cell increments in any or all three spatial dimensions, as shown in FIG. 2 extending to a maximum depth at the wellhead position (0,0,n) and to a maximum distance from the wellhead at point (n,n,n). The number of cell increments may be the same or different in each of the three dimensions. The above example is described in terms of Cartesian coordinates, however it should be clearly understood that cylindrical, spherical or other coordinate system may be used in other implementations.

For each selected cell defined in the coordinate system, there is an expected travel path of seismic energy to each of the seismic sensors 12A-12E, and each such travel path will be associated with a travel time of seismic energy. The expected travel path and associated travel time may be calculated using a velocity model for the subsurface Earth formations (16, 18, 20 in FIG. 1) that may be obtained from various sources such as reflection seismic data and well log data, among others. The expected travel times thus calculated for each defined cell in the coordinate system may be stored in a table. The signals from each sensor 12A-12E that correspond to a particular defined point can be adjusted sequentially for travel time from a given cell location (similar to moveout correction in reflection seismic data processing) and are then summed or "stacked." The result is, for each cell, a stacked data trace over at least part of and preferably the entire duration of data recording. The foregoing procedure is referred to as transforming the seismic signals into the source space domain. The travel time table based on the velocity model is a convenient implementation to enable rapid computation of the stacked traces in the source space domain. It should be understood that other computation devices may be used to perform the signal domain transformation.

Figure 3:
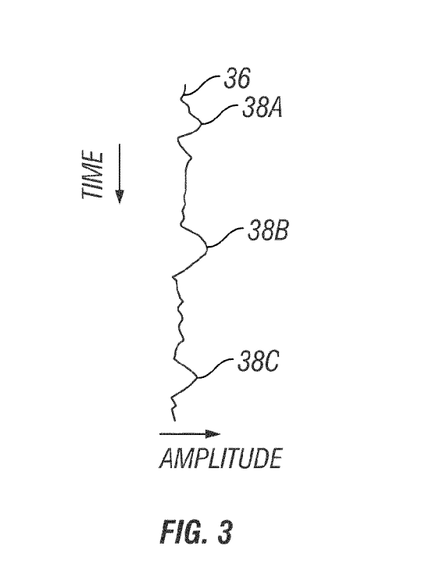
FIG. 3 illustrates selecting "triggers" from seismic data transformed to the source space domain according to one embodiment of a method according to the invention.

The transformed seismic signals may then be processed using data processing techniques known in the art to further reduce noise and/or enhance signal. After such processing, the source domain transformed seismic data, referred to for convenience herein as "source traces", are analyzed to determine the presence of events or "triggers", which are nominally high amplitude or high energy features that are believed to correspond to seismic events originating in the Earth's subsurface. An example of trigger identification is shown graphically in FIG. 3. A data trace 36 of domain transformed signal at one selected point is shown by curve 36. Triggers are shown at 38A, 38B and 38C. Triggers may be identified by, for example, amplitude exceeding a selected threshold, trace energy within a selected length time window exceeding a selected threshold, or the first derivative of the trace amplitude with respect to time exceeding a selected threshold. Other devices for selecting triggers will occur to those skilled in the art. More detailed description of example techniques for identifying triggers and the likely hypocenters of events detected in the seismic signals are described in the Duncan et al. patent application publication referred to above. Generally, techniques as described in the Duncan et al. publication identify a point in time and space corresponding to each such trigger. The spatial and temporal distribution of such identified points may be compared to predetermined space and time distributions for modeled seismic events given the seismic velocity distribution used to perform the signal transformation into the source space domain. Triggers which have space and time distributions that meet such predetermined space and time distribution criteria may be used to determine the hypocenters of seismic events in the subsurface. Those triggers which are not spatially and temporally distributed according to such predetermined criteria may be identified as noise and not used for determining hypocenters.

Having described in general terms the acquisition and processing of passive seismic signals, and their application to determining spatial and time origin of microseismic events in the subsurface, a particular example of adaptive velocity filtering to reduce noise in the acquired seismic signals will now be explained with reference to FIGS. 4 and 5. As explained above, the seismic sensors (12 in FIG. 1) may be deployed in a selected pattern near an area of the subsurface being evaluated, for example, near the Earth's surface. Such selected pattern may be substantially along lines extending radially outward from the position of the wellhead (30 in FIG. 1) in selected azimuthal directions. Such arrangement of seismic sensors is used in connection with fracture monitoring services provided under the service mark FRACSTAR, which is a registered service mark of Microseismic, Inc. the assignee of the present invention. Therefore, each line of seismic sensors will have an associated azimuth (geodetic direction) and distance from the wellhead (or other central location) to each sensor.

Figure 4:
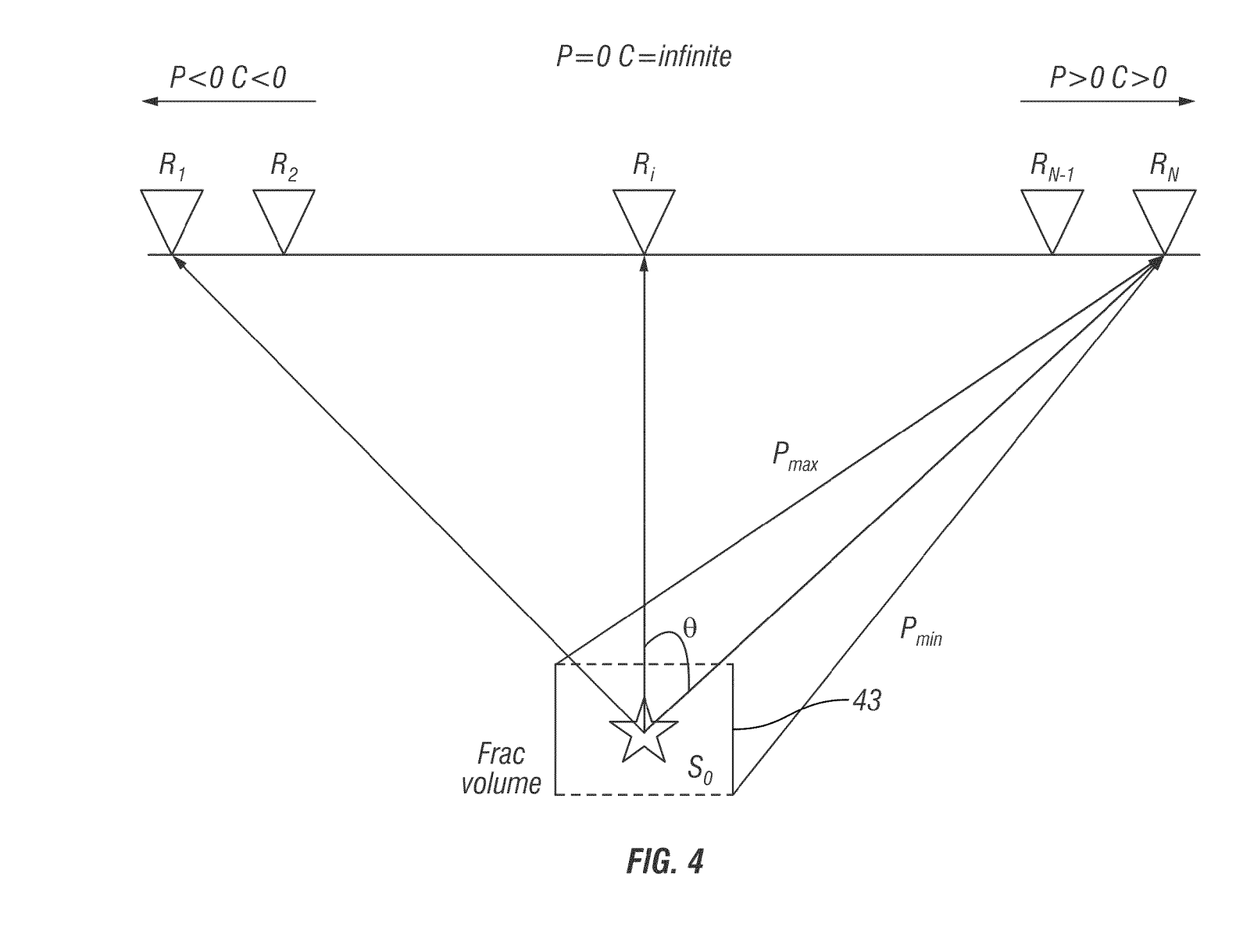
FIG. 4 shows an example line of seismic sensors disposed above a fracture volume to illustrate the principles of apparent velocity and apparent dip.

Referring to FIG. 4, the seismic sensor array generally extends about 3-4 km in horizontal distance. One line of such sensors is shown by individual sensors $R_1$ through $R_N$ in FIG. 4. The foregoing distances are roughly 10 times the length of the volume 43 in the subsurface within which most of the induced microseismic events caused by the hydraulic fracturing treatment are expected to occur. For simplicity, FIG. 4 shows only a 2 dimensional profile to illustrate the technique for adaptive velocity filtering according to the invention.

Due to the large contrast between the sensor array size and the size of the fracture volume 43, the apparent velocity (C) of the primary seismic energy generated by the fracturing events varies substantially from one end of the sensor array (e.g., at $R_1$) to the other end (e.g., at $R_N$). For example, the apparent velocities are negative, positive and infinite for receivers on the left, right and directly above (e.g., at $R_i$) a seismic event $S_0$, respectively. To take advantage of the apparent velocity variation, an adaptive velocity filter may be devised to filter the seismic signals based on the estimated apparent velocity associated with each seismic sensor. Therefore, in the present invention, the velocity filter passband will change from one receiver to another.

The apparent velocity C of any seismic wave from an event to each seismic sensor is based on Snell's Law:

$$p = \frac{1}{C} = \frac{\sin(\theta)}{V_{RMS}} \quad (1)$$

Where $\theta$ and $V_{rms}$ are the incidence angle and root-mean-square velocity above the source, respectively, while p is the slowness, or dip, as often called in the reflection seismology. "C" is apparent velocity. Note that the dip changes continuously across the sensor array above the event from left to right.

For a three dimensional case, the apparent seismic event is projected onto the vertical plane containing the seismic sensor line and the incident angle is computed as shown in FIG. 4. Alternatively, the dip may also be computed using equation (2):

$$p = \frac{1}{C} = \frac{dt}{dx} \quad (2)$$

where dx and dt are space interval and travel time difference between two adjacent seismic sensors, respectively. dx can be determined using the sensor coordinates as shown in FIG. 2 and dt can be determined using the travel time table described above.

For an estimated fracture (e.g., volume 43), the minimum and maximum dips are calculated for each seismic sensor corresponding to the positions of apparent seismic events in the volume 43. The velocity filter is then applied to suppress seismic energy traveling with apparent dips (slowness or velocity) outside of the filter passband. Cosine-tapers may be applied to both ends of the velocity passband. A particularly useful form of velocity filtering is frequency-wavenumber (f, k) filtering. This form of velocity filtering may be used in the present example as will be explained below with reference to FIG. 5, however, those skilled in the art will appreciate that other velocity filter types may be used, for example, slant stack (tau-p) filtering.

The maximum and minimum dips may be calculated as follows. For each sensor, for example $R_N$ in FIG. 4, the apparent velocity varies with respect to the seismic event source location. For the seismic event source shown at $S_0$, equation (3) or (4) may be used to compute an apparent dip "P". For purposes of the present invention we assume that the volume 43 in which seismic events occur (fracturing of the formation) is substantially rectangular. For each sensor, the dip value P corresponding to each corner of the volume 43 is determined. The minimum and maximum P are then calculated for each sensor. If the formation velocity above the seismic source volume is considered to be constant, the minimum dip (Pmin) and maximum dip (Pmax) are associated with the upper-left and lower-right corners of the source volume 43, respectively, as shown in FIG. 4. The foregoing minimum and maximum dip values for each sensor may be used to select the passband for the velocity filter used on the signals corresponding to each sensor.

Figure 5:
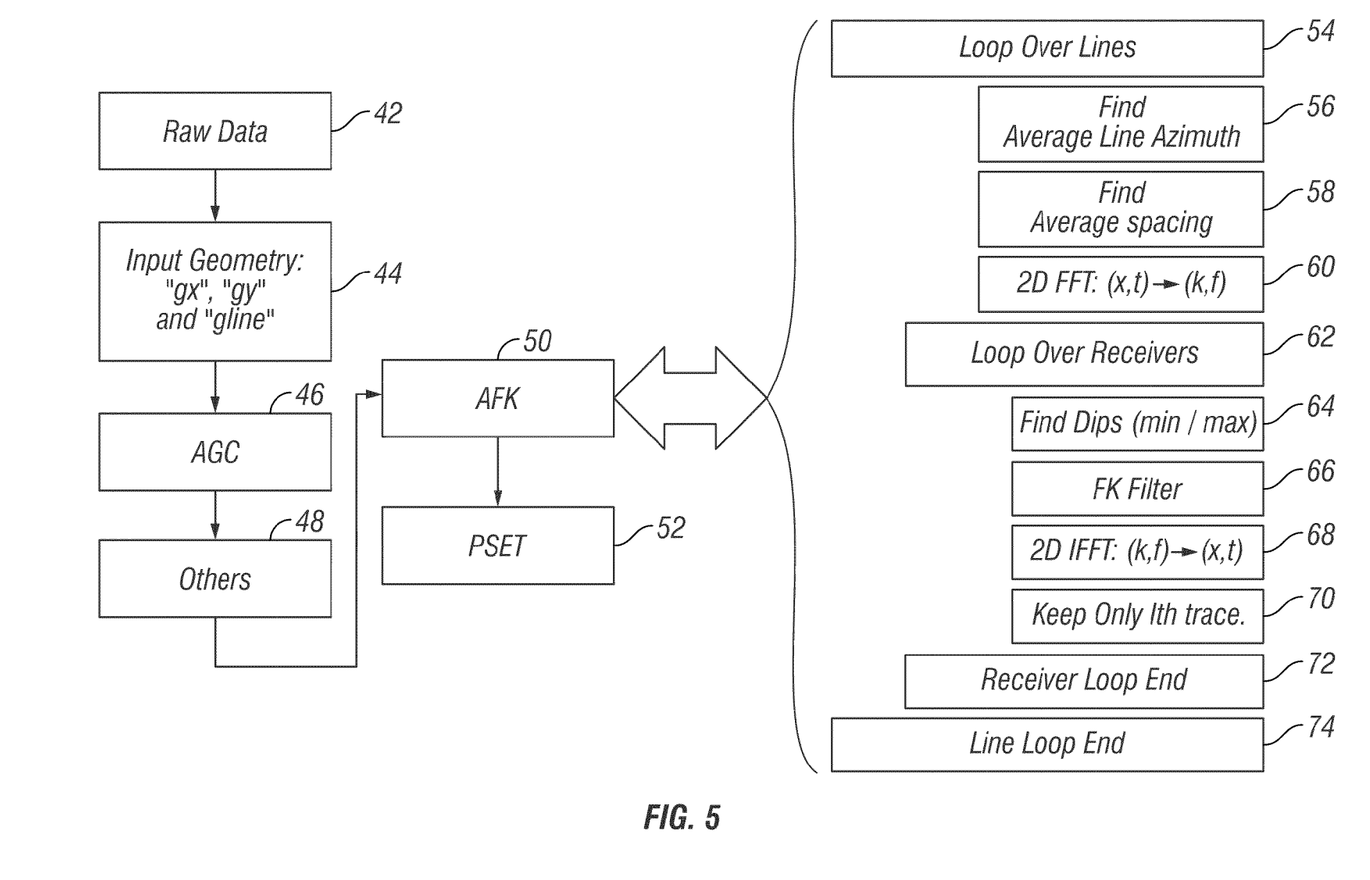
FIG. 5 is a flow chart of one example implementation.

Referring to FIG. 5, an example process for velocity filtering according to the invention may include the following. At 42, seismic signals are acquired, substantially as explained above with reference to FIG. 1. At 44, the geometry of the array of sensors is entered into the processing procedure. The array geometry may include the coordinate positions of each sensor ($g_x$, $g_y$) with respect to a selected reference (e.g., the wellhead 30 in FIG. 1) and the approximate geometry of each line of sensors. At 46, preprocessing such as automatic gain control may be performed. Other preprocessing features, at 48, may be included, such as filtering to remove signals traveling horizontally at the velocity of the formations proximate the surface. Such filtering, as explained above, may be facilitated by using the arrangement of seismic sensors as described herein in radially extending lines of sensors centered at the wellhead (30 in FIG. 1).

At 50, adaptive velocity filtering may be performed. The filtering in the present example may be performed as shown at 54 through 74 in FIG. 5. At 54, a process loop may begin for each line in the array of seismic sensors. At 56, the average azimuth of each sensor line is determined. Such may be performed, for example by calculating a best fit line through the actual geodetic position of each sensor along each line, wherein the best fit line is constrained to have the reference (e.g., the wellhead 30 in FIG. 1) be at one end of the line. A geodetic direction of the best fit line is then determined to be the line azimuth. An average spacing between sensors in the line may then be determined, for example by dividing the best fit line length by the number of sensors therein. The average distance may be used to plot idealized sensor positions along each line, that is, the positions that would occur if the sensors were spaced exactly at the average and exactly along the best fit line. At 60, the signals are transformed into the frequency wavenumber domain, for example using a fast Fourier transform. At 62, for each sensor (say ith sensor) on the line being processed, at 64, apparent maximum and minimum dips are calculated for each sensor. The maximum and minimum dips are used to set a passband for a frequency wavenumber (f, k) filter. Signal components traveling at apparent velocities above and below the passband limits, at 66, are filtered out using the velocity filter. At 68, the filtered signals are inverse transformed, for example using a fast Fourier transform, back to the space-time domain. At 70, only the current (i-th) trace is kept as the processed trace corresponding to each particular sensor position. The foregoing is repeated, at 72, for each sensor. At 74, the process is repeated for each line of sensors in the array. The result of the foregoing procedure is a set of data "traces" (processed signal recording) each corresponding to a sensor position in which components traveling outside an apparent velocity window have been removed.

After processing as explained above, the processed signals may be used, at 52, to determine hypocenters of the various seismic events within the volume (40 in FIG. 4). The hypocenters may be used, for example, to determine position of the fluid front with respect to time. With the improved signal-to-noise ratio, the processed signals may also be used to invert for the possible focal mechanism of seismic events and other studies.

Figure 6A:
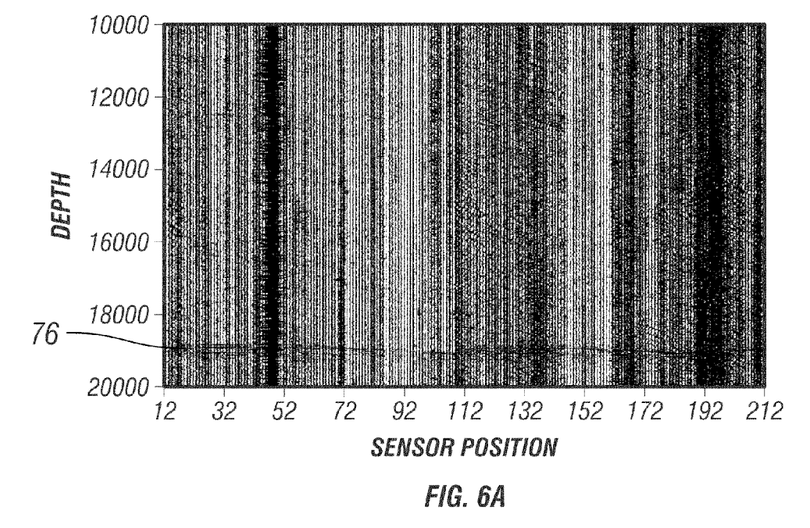
FIGS. 6A and 6B show, respectively, data acquired using an array such as shown in FIG. 1, both before and after velocity filtering according to FIG. 5.
Figure 6B:
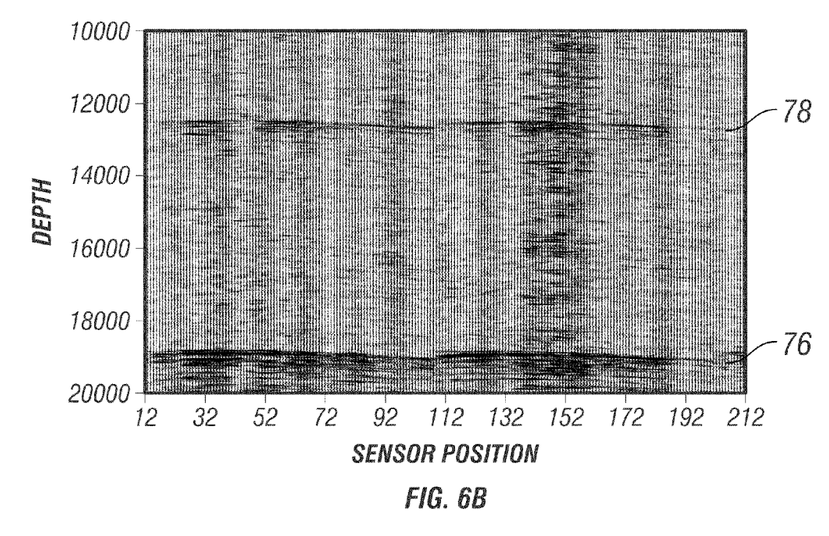

An example of the results of the foregoing procedure on actual recorded signals is shown in FIGS. 6A and 6B. FIG. 6A shows a selected time window of the recorded signals for an array of sensors deployed as explained herein. FIG. 6B shows the same signals after processing according to the example procedure explained above with reference to FIG. 5. The strong signal near the bottom 76 is a passive seismic event. It will be appreciated by those skilled in the art that the signal to noise of the event 76 is significantly improved after applying the velocity filtering explained above by comparing the appearance of the event 76 in FIG. 6A with the appearance in FIG. 6B. Similarly, time, another event 78 near the top (not visible in FIG. 6A) is illuminated by the foregoing process.

Figure 7:
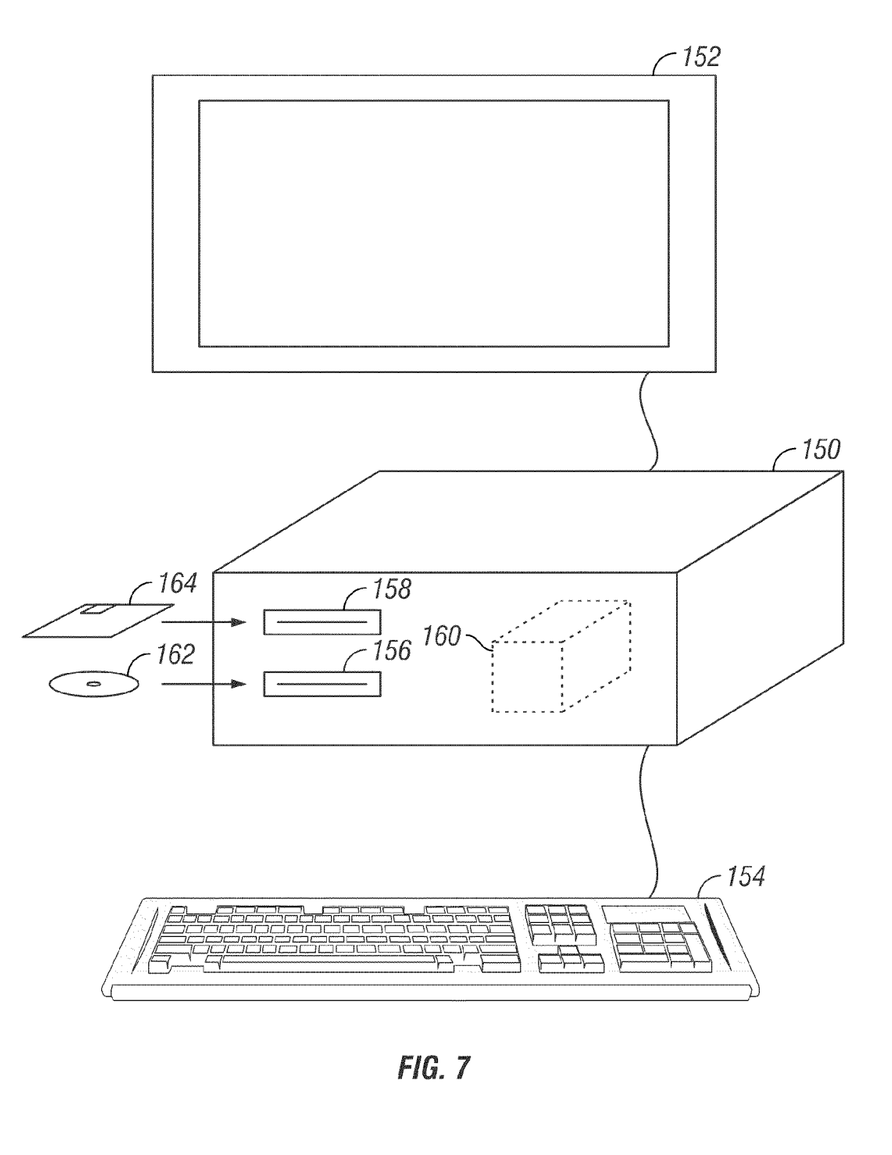
FIG. 7 shows a computer and computer readable media according to another aspect of the invention.

In another aspect, the invention relates to computer programs stored in computer readable media. Referring to FIG. 7, the foregoing process as explained with reference to FIGS. 1-6, can be embodied in computer-readable code. The code can be stored on a computer readable medium, such as floppy disk 164, CD-ROM 162 or a magnetic (or other type) hard drive 166 forming part of a general purpose programmable computer. The computer, as known in the art, includes a central processing unit 150, a user input device such as a keyboard 154 and a user display 152 such as a flat panel LCD display or cathode ray tube display. According to this aspect of the invention, the computer readable medium includes logic operable to cause the computer to execute acts as set forth above and explained with respect to the previous figures. The computer, as explained above, may be in the recording unit (10 in FIG. 1) or may be any other computer.

Methods according to the invention may improve the ability to determine spatial and time origin of microseismic events in the subsurface. It may also help other traditional seismic studies in source mechanism, anisotropy and attenuation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for seismic event mapping, comprising:
   adaptively velocity filtering seismic signals recorded by seismic sensors disposed at selected positions proximate an area of the Earth's subsurface being evaluated, the seismic sensors generating at least one of optical and electrical signals, the at least one of electrical and optical signals conducted to a computer for processing, wherein the adaptive velocity filtering comprises estimating an apparent velocity of seismic energy traveling from at least two selected points in the subsurface to each of the selected positions, using the apparent velocities to determine a filter passband for each of the plurality of selected positions and filtering the recorded signals for each of the plurality of selected positions using the determined filter passband;
   transforming the velocity filtered signals into a domain of possible spatial positions of a source of seismic events, the transforming comprising causing the recorded seismic signals to correspond to signals that would be detected by a seismic sensor at each selected position if a seismic event had originated at each position in the domain; and
   determining an origin in spatial position and time of at least one seismic event originating in the subsurface from space and time distribution of at least one attribute of the transformed seismic data.

2. The method of claim 1 wherein the transforming is performed using a model of velocity of Earth formations in a volume of the Earth's subsurface associated with the domain.

3. The method of claim 1 further comprising identifying events in the transformed data that have characteristics corresponding to seismic events and determining the origin when selected ones of the events meet predetermined space and time distribution criteria.

4. The method of claim 3 wherein the characteristics comprise amplitude.

5. The method of claim 1 wherein the selected positions are proximate the Earth's surface.

6. The method of claim 1 wherein the adaptive velocity filtering comprises frequency wavenumber filtering.

7. The method of claim 1 wherein the velocity filtering comprises slant stack filtering.

8. A method for seismic event mapping, comprising:
acquiring seismic signals by disposing a plurality of seismic sensors at selected positions proximate an area of the Earth's subsurface to be evaluated,
adaptively velocity filtering the acquired, transformed seismic signals, wherein the adaptive velocity filtering comprises estimating an apparent velocity of seismic energy traveling from at least two selected points in the subsurface to each of the selected positions, using the apparent velocities to determine a filter passband for each of the plurality of selected positions and filtering the recorded signals for each of the plurality of selected positions using the determined filter passband;
transforming the velocity filtered signals into a domain of possible spatial positions of a source of seismic events the transforming comprising causing the recorded seismic signals to correspond to estimates of a seismic signal that would occur if a seismic event had originated at each position in the domain; and
determining an origin in spatial position and time of at least one seismic event originating in the subsurface from space and time distribution of at least one attribute of the transformed seismic signals.

9. The method of claim 8 wherein the transforming is performed using a model of velocity of Earth formations in a volume of the Earth's subsurface associated with the domain.

10. The method of claim 8 further comprising identifying events in the transformed signals that have characteristics corresponding to seismic events and determining the origin when selected ones of the events meet predetermined space and time distribution criteria.

11. The method of claim 10 wherein the characteristics comprise amplitude.

12. The method of claim 8 wherein the selected positions are proximate the Earth's surface.

13. The method of claim 8 wherein the adaptive velocity filtering comprises frequency wavenumber filtering.

14. The method of claim 8 wherein the velocity filtering comprises slant stack filtering.

15. A computer program stored in a computer readable medium, the program having logic operable to cause a programmable computer to perform steps comprising:
adaptively velocity filtering seismic signals recorded at selected positions proximate an area of the Earth's subsurface being evaluated, wherein the adaptive velocity filtering comprises estimating an apparent velocity of seismic energy traveling from at least two selected points in the subsurface to each of the selected positions, using the apparent velocities to determine a filter passband for each of the plurality of selected positions and filtering the recorded signals for each of the plurality of selected positions using the determined filter passband;
transforming the velocity filtered signals into a domain of possible spatial positions of a source of seismic events, the transforming comprising causing the recorded seismic signals to correspond to signals that would be generated at each position if a seismic event had originated at each position in the domain; and
determining an origin in spatial position and time of at least one seismic event originating in the subsurface from space and time distribution of at least one attribute of the transformed seismic data.

16. The computer program of claim 15 wherein the transforming is performed using a model of velocity of Earth formations in a volume of the Earth's subsurface associated with the domain.

17. The computer program of claim 15 further comprising identifying events in the transformed data that have characteristics corresponding to seismic events and determining the origin when selected ones of the events meet predetermined space and time distribution criteria.

18. The computer program of claim 17 wherein the characteristics comprise amplitude.

19. The computer program of claim 15 wherein the selected positions are proximate the Earth's surface.

20. The computer program of claim 15 wherein the adaptive velocity filtering comprises frequency wavenumber filtering.

21. The computer program of claim 15 wherein the adaptive velocity filtering comprises slant stack filtering.

* * * * *